(12) United States Patent
Aldridge et al.

(10) Patent No.: US 6,847,924 B1
(45) Date of Patent: Jan. 25, 2005

(54) METHOD AND SYSTEM FOR AGGREGATING DATA DISTRIBUTION MODELS

(75) Inventors: Bruce E. Aldridge, Oceanside, CA (US); Douglas J. Durrant, Mission Viejo, CA (US)

(73) Assignee: NCR Corporation, Dayton, OH (US)

( * ) Notice: Subject to any disclaimer, the term of this patent is extended or adjusted under 35 U.S.C. 154(b) by 921 days.

(21) Appl. No.: 09/596,635

(22) Filed: Jun. 19, 2000

(51) Int. Cl.[7] .......................... G06F 7/60; G06F 17/10; G06F 101/00

(52) U.S. Cl. .................. 703/2; 703/1; 703/6; 702/179; 702/180; 702/181

(58) Field of Search ............................. 703/1–2, 6–12; 702/179–181

(56) References Cited

U.S. PATENT DOCUMENTS 6,263,337 B1 * 7/2001 Fayyad et al. .................. 707/6
6,397,166 B1 * 5/2002 Leung et al. ................ 702/179

OTHER PUBLICATIONS

Wilkinson, "Dot Plots," American Statistician, vol. 53 No. 3, pp. 276–281 (Aug. 1999).*
Laidlaw et al, "Classification of Material Mixtures in Volume Data for Visualization and Modeling," Technical Report CS–TR–94–07, California Institute of Technology (1994)(paper available at http://citeseer.nj.nec.com/laidlaw94classification.html).*

* cited by examiner

*Primary Examiner*—Samuel Broda (57) ABSTRACT

A system and method for creating an aggregated data model from a plurality data distribution models having bins approximating data elements in a plurality of data distributions is disclosed. Each bin of each data distribution model has a polynomial formula for approximating data elements in a respective data distribution. A method for creating the aggregated data model comprises: determining a start point of the aggregated data model having the minimum value and an end point having a maximum value of all of the bins of all of the data distribution models; setting a start point of a first bin of the aggregated data model; setting an end point of a last bin of the aggregated data model; determining a total number of points for the aggregated data model; approximating the data elements described by each data distribution model, each approximated data element comprising one point in the aggregated data model; sorting the points from minimum to maximum; distributing the points into one or more bins in the aggregated data model; and determining a polynomial formula for the points for each bin of the aggregated data model.

12 Claims, 9 Drawing Sheets

METHOD AND SYSTEM FOR AGGREGATING DATA DISTRIBUTION MODELS

BACKGROUND OF THE INVENTION

1. Field of the Invention

The invention relates to method and system for aggregating data distribution models. More specifically, the invention provides a system and method of aggregating or combining data distribution models while correctly maintaining the applicability of statistical and analytical techniques.

2. Description of the Prior Art and Related Information

When a researcher or engineer is involved in the analysis of a large quantity of data, called a data distribution, some summarization of the data elements in the data distribution is generally necessary because of the limitations of existing hardware and software. Generally this summarization of the distribution center and spread, including mean, sigma (standard deviation) and the number of data elements in the data distribution, are used. Alternatively sampling may be used to extract a smaller, more manageable subset of data that can be analyzed.

Unfortunately summarizing the data elements with a mean and sigma assumes that the distribution is Gaussian, or normal, and represents a single distribution and is not a mixture of independent distributions. Similarly, sampling may miss important elements of the distribution, for example outliers or bimodal patterns, unless the sample is sufficiently large.

Thus, there is a need for a system for advanced analysis that provides the benefit of maintaining the overall shape and characteristics of the data distribution while keeping the data storage requirements to a minimum. There is a further need for a system that can perform aggregation of small subgroups of the data distribution, thus keeping computation needs to a minimum. There is a further need for such a system with which statistical tests can be properly performed without making assumptions about the data distribution. There is a further need for a system with which complex analytics can be performed including basic statistical functions, such as mean, minimum, maximum, standard deviation, etc. can be performed as well as complicated correlation and modeling studies. There is a further need for a system that naturally weights the highest data concentrations with the greatest accuracy in the approximation, wherein outliers are de-emphasized but not removed. There is a further need for a system with which an approximation of the original data distribution can be rebuilt from the model and estimates of the errors in this rebuilding can be made.

SUMMARY OF THE INVENTION

A system for creating an aggregated data model from a plurality data distribution models is disclosed. Each data distribution model is a summarized version of a data distribution having one or more data elements. Each data element has a value. Each data distribution model has one or more bins, wherein each bin approximates a subset of the data elements. Each bin comprises a start point having a value, an end point having a value, and a polynomial formula that approximates the data elements for the bin. Each data distribution model thus comprises a summarized representation of a data distribution, wherein the aggregated data model represents a combination of two or more of the data distribution models.

The system includes a processor for executing a computer program that is executable on a processor.

The computer program is adapted to perform a plurality of steps in a method for creating the aggregated data model. The computer program may contain a plurality of modules for performing the steps. One step comprises determining which start point has the minimum value and which end point has the maximum value of all of the bins of all of the data distribution models. The next step performed is setting a start point of a first bin of the aggregated data model to said start point determined to have the minimum value. The next step is setting an end point of a last bin of the aggregated data model to said end point determined to have the maximum value. The next step comprises determining a total number of points for the aggregated data model by adding the values indicating the number of data elements from all bins from all data distribution models, each point comprising an approximated value of a data element from one of the data distribution models. The next step comprises approximating the data elements in the data distribution described by each data distribution model using the start point, polynomial formula, and number of data elements for each bin in each respective data distribution model, each approximated data element comprising one point in the aggregated data model. The next step is to sort the points from minimum to maximum. The next step comprises distributing the points into one or more bins in the aggregated data model such that a substantially equal number of points are in each bin of the aggregated data model. The end point of each bin in the aggregated data model may then be determined. The next step comprises determining a polynomial formula for the points for each bin of the aggregated data model.

The computer program may create the bins of the aggregated data model on a bin by bin basis. In that case the steps of approximating the data elements for the points of each bin, determining the end point for each bin, and determining the polynomial formula for each bin are performed for each bin individually.

DETAILED DESCRIPTION OF THE PREFERRED EMBODIMENTS

Figure 1:
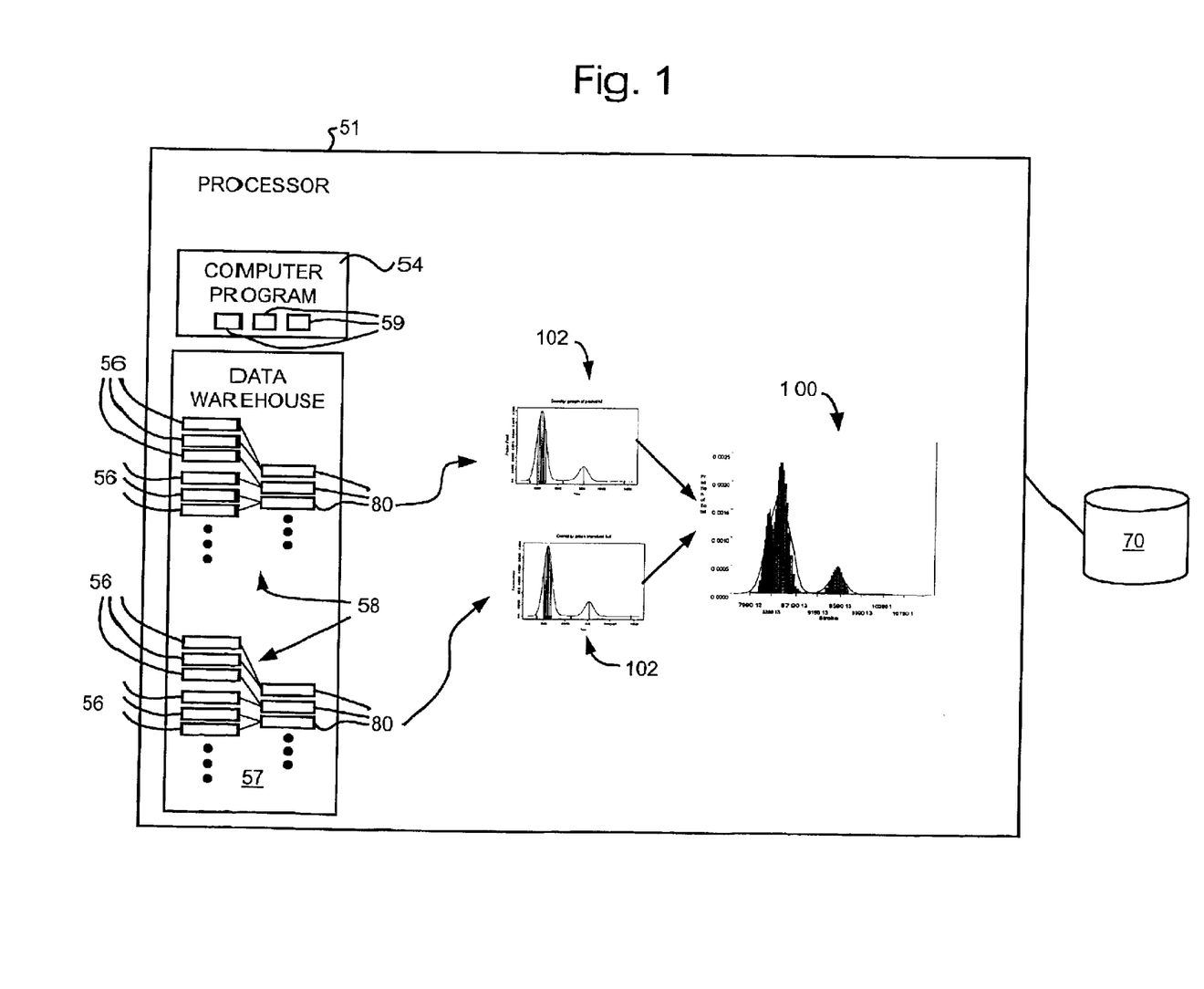
FIG. 1 is a block diagram illustrating the major components of a system for creating an aggregated data model from a plurality data distribution models.

With reference to FIG. 1, a system for creating an aggregated data model 100 from a plurality data distribution models 102 is shown. Each data distribution model 80 is a summarized version of a data distribution 58 having one or more data elements 56, each data element 56 having a value, each data distribution model 102 having one or more bins 80 for approximating a subset of the data elements, each bin comprising a start point having a value, an end point having a value, and a polynomial formula approximating the data elements for the respective bin. Each data distribution model 102 thus comprises a summarized representation of a data distribution 58, wherein the aggregated data model 100 represents a combination of two or more of the data distribution models 102.

The system includes a processor 51 for executing a computer program 54 that is executable on a processor 51.

Figure 2:
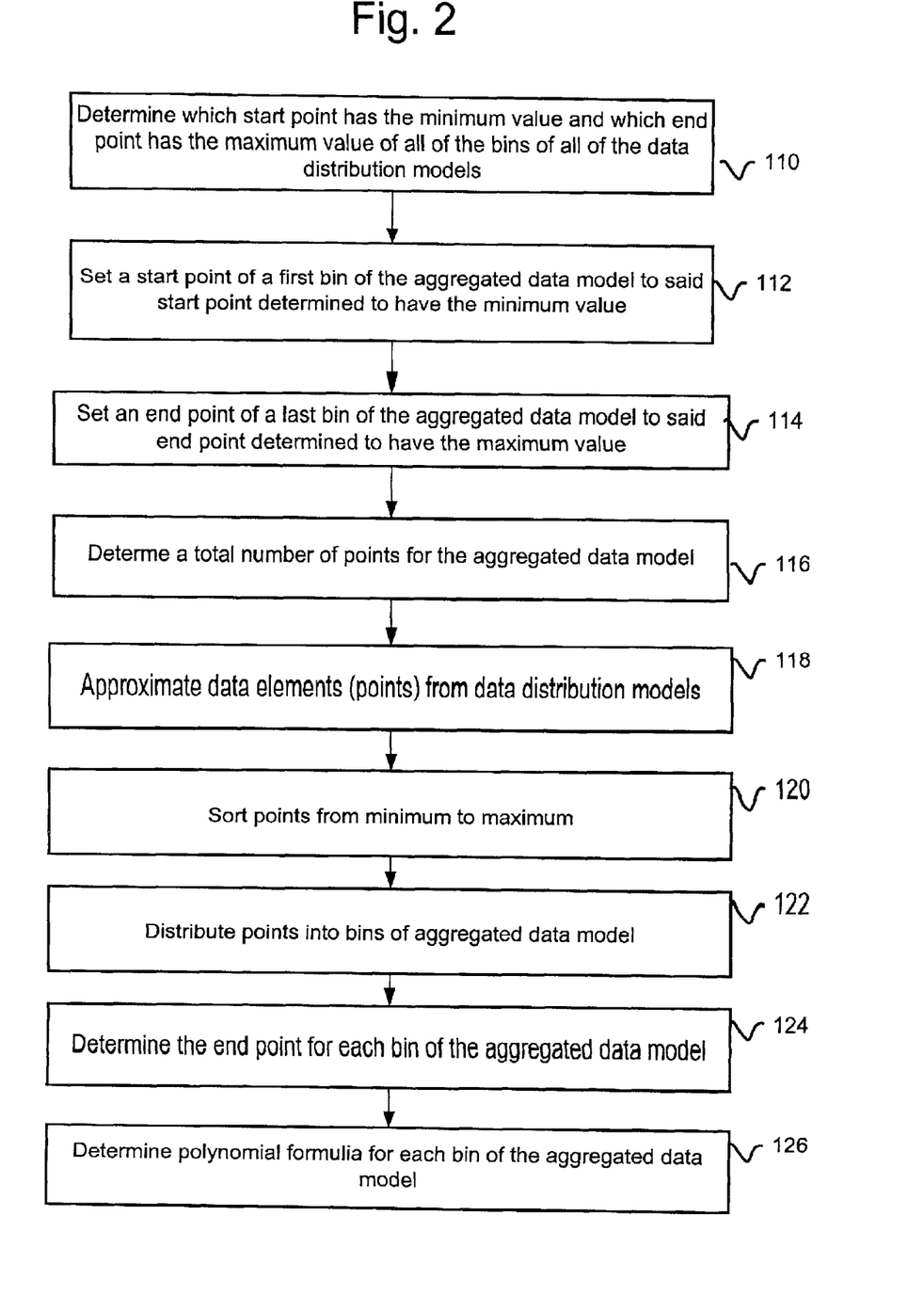
FIG. 2 is a flow diagram illustrating steps that may be performed by the system of FIG. 1.

With reference to FIG. 2, the computer program 54 is adapted to perform a plurality of steps in a method for creating the aggregated data model 100. The computer program 54 may contain a plurality of modules 59 for performing the steps. One step comprises determining which start point has the minimum value and which end point has the maximum value of all of the bins 80 of all of the data distribution models 102, step 110. The next step performed is setting a start point of a first bin of the aggregated data model (a first bin of 80 in FIG. 1 described below) to said start point determined to have the minimum value, step 112. The next step is setting an end point of a last bin 180 of the aggregated data model to said end point determined to have the maximum value, step 114. The next step comprises determining a total number of points for the aggregated data model by adding the values indicating the number of data elements 56 from all bins from all data distribution models 102, each point comprising an approximated value of a data element 56 from one of the data distribution models 102, step 116. The next step comprises approximating the data elements 56 in the data distribution 85 described by each data distribution model 102 using the start point, polynomial formula, and number of data elements 56 for each bin 80 in each respective data distribution model 102, each approximated data element 56 comprising one point in the aggregated data model 100, step 118. The next step is to sort the points from minimum to maximum, step 120. The next step comprises distributing the points into one or more bins (180 in FIG. 9) in the aggregated data model 100 such that a substantially equal number of points are in each bin 180 of the aggregated data model 100, step 122. The end point of each bin 180 in the aggregated data model 100 may then be determined, step 124. The next step comprises determining a polynomial formula for the points for each bin 180 of the aggregated data model 100, step 126.

Figure 9:
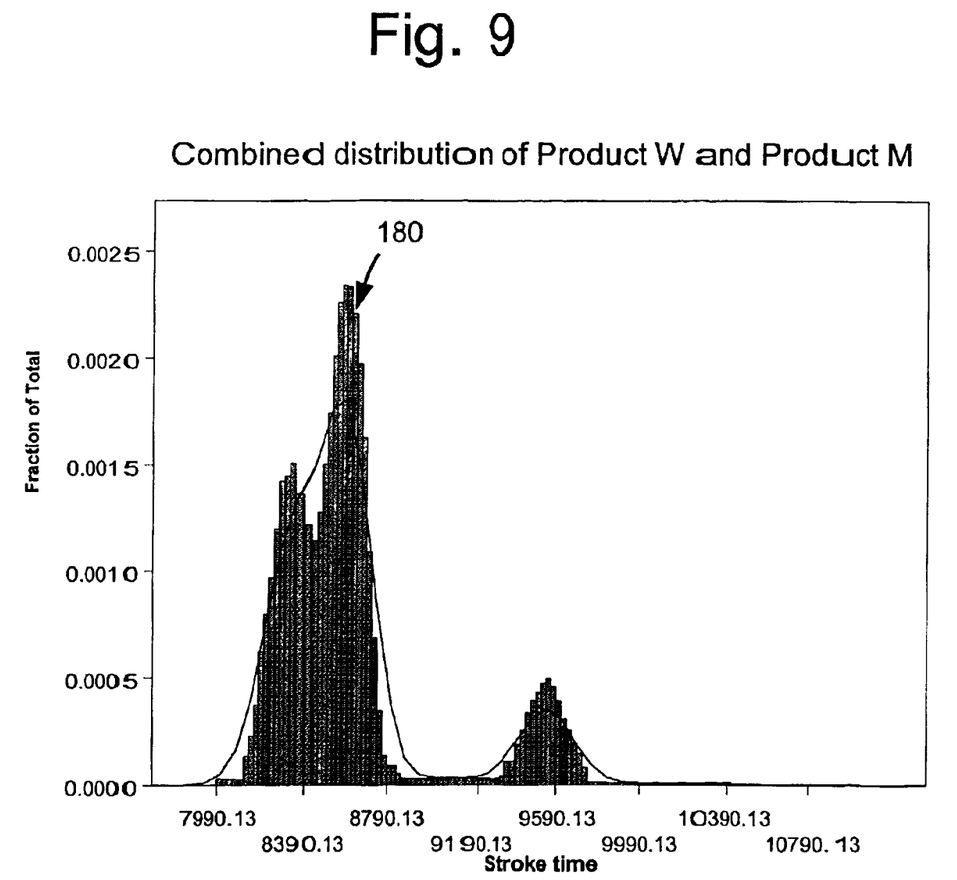
FIG. 9 is a graphic illustration of an aggregated data model aggregated from data distribution models of the data distributions of FIG. 5.

The computer program may create the bins 180 of the aggregated data model 100 on a bin by bin basis. In that case the steps of approximating the data elements 56 for the points of each bin 180, determining the end point for each bin 180, and determining the polynomial formula for each bin are performed for each bin 180 individually. The data elements 56 corresponding to the bins 80 of the data distribution models 102 are thus approximated as needed using the respective polynomial formula for the bin 80 of the respective data distribution model 102 in which the needed data elements 56 are contained. This technique tends to conserve resources for the processor 51 because once each bin 180 in the aggregated data model 100 is created, and the polynomial formula for that bin 180 is determined, then the approximated data elements, or points, for that particular bin 180 may be discarded before processing the next successive bin 180 for the aggregated data model.

The step of approximating the polynomial formula may comprise finding a quadratic formula having the best fit with the points by using mathematical techniques such as the least squares method. In the simplest case, the start and end points of the each bin 180 may be fit into a linear formula by calculating the slope between the start and end point, and the y intercept which is equal to the start point of the bin. Finding a polynomial formula is the preferred method. The term polynomial formula as used herein may include a linear formula, quadratic formula or other higher order polynomial formulas.

The step of distributing the points between, or into, the bins 180 in the aggregated data model 100 may comprise dividing the number of total points in the aggregated data model 100 by the number of bins in the aggregated data model 100. If the number of points in the aggregated data model 100 is not equally divisible by the number of bins 180, then the number of points in each bin 180 is determined by dividing the number of points by the number of bins 180, and then adding one to the count of the points in each of a number of bins 180 equal to the remainder after dividing, wherein the bins 180 that have one added to the count is determined according to the following formula:

for k from 1 to r $$bin_{add} = INT((n*k)/(r+1))$$

next k wherein $bin_{add}$ is the sequential bin number to add one to the count of points to include therein, n is the total number of bins 180 in the aggregated data model 100, r is the remainder from dividing the number of points in the aggregated data model 100 by the number of bins 180, and INT is a function for rounding the result of the bracketed formula to produce an integer result.

Figure 3:
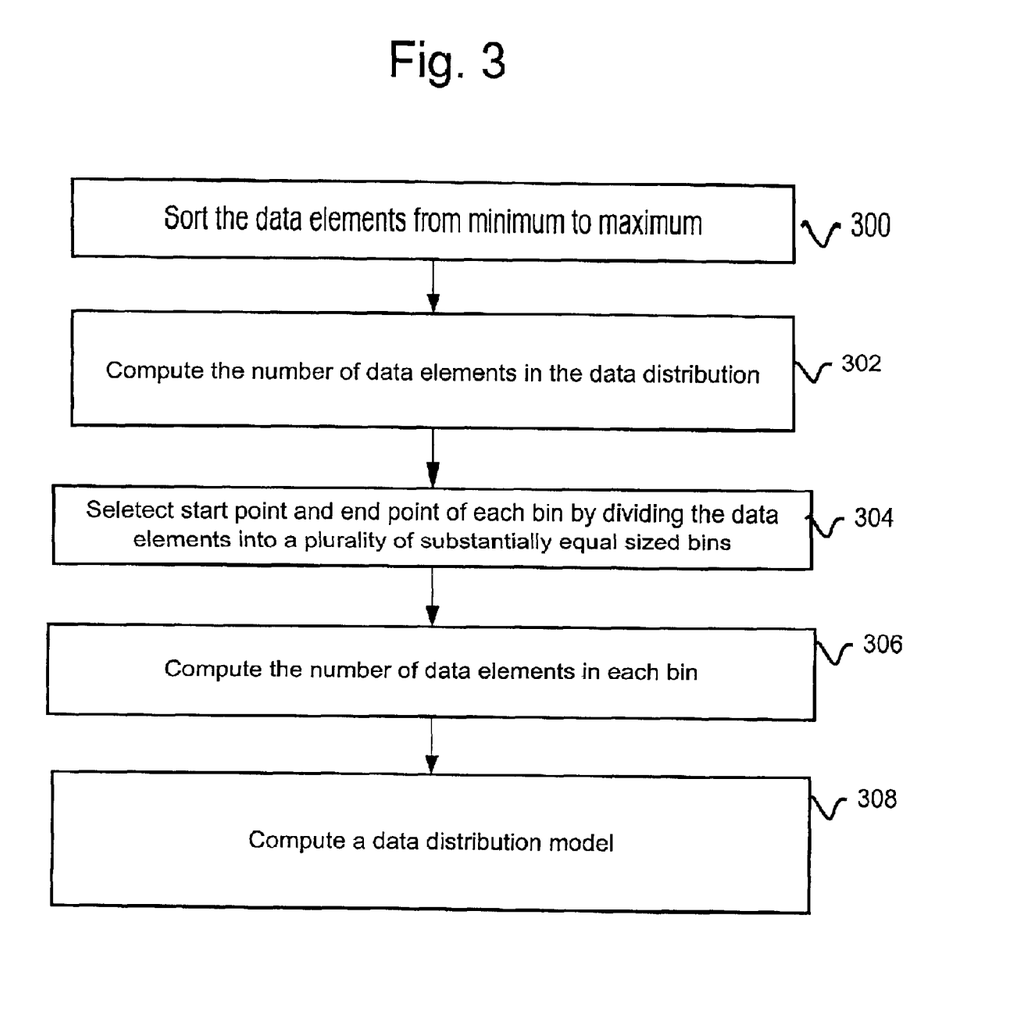
FIG. 3 is a flow diagram illustrating steps that may be performed by the system of FIG. 1 for creating each of the plurality of data distribution models that are aggregated by the system FIG. 1.

Each of the data distribution models 102 that are used in aggregation may have been created using one of several different methods. With reference to FIG. 3, a flow diagram illustrating a method preformed by the computer program 54 for creating each of the one or more data distribution models 102 from each of the one or more data distributions 58 is shown. The data elements 56 are sorted from minimum to maximum, step 300. The number of data elements 56 in the data distribution 58 are computed, step 302. The value of the start point and the value of the end point of each bin 80 are determined by distributing, or dividing, the data elements 56 into a plurality of substantially equal sized bins 80 for each data distribution 58, step 304, as explained in more detail with respect to FIG. 4 below, step 304. The number of data elements 56 in each bin 80 are counted according to the following formula, step 306:

start point<element value<=end point wherein the start point is the start point of the respective bin 80, the element value is the value of each data element 56 in each bin, and end point is the end point of the respective bin 80. The data distribution model 102 may thus be computed by setting, for each bin 80, the start point of the bin 80, the end point of the bin 80, and the number of data elements in the bin 80, step 308 for a linear model, or adding the step of determining a polynomial formula for a data distribution model 102 that so uses one for approximating data elements 56 in each bin 80.

Figure 4:
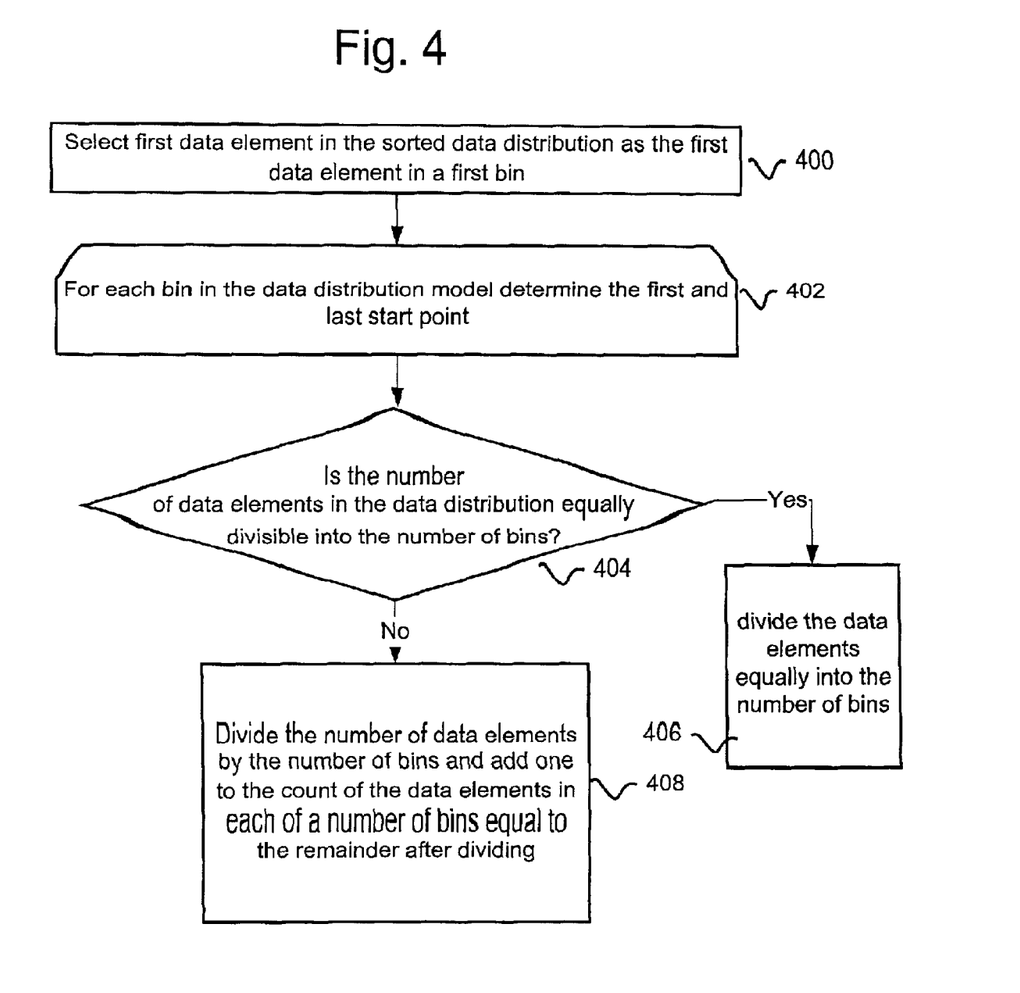
FIG. 4 is a flow diagram illustrating the steps performed by the computer program for determining the start points and end points of the bins for each data distribution model according to the method of FIG. 3 and system of FIG. 1.

With reference to FIG. 4, a flow diagram illustrating the steps performed by the computer program 54 for determining the start points and end points of the bins 80 for each data distribution model 102 according to the method of FIG. 3 and system of FIG. 1 is shown. The start point of the first bin 80 of the data distribution model 102 is selected as the value of the data element 56 having the minimum value in the sorted data distribution 58, step 400. The start point and end point of each bin 80 in the data distribution model 102 is determined according to the following criteria, step 402:

(a) if the number of data elements 56 in the data distribution is equally divisible into the number of bins 80, step 404, the end point of the first bin 80 is equal to the value of the ith data element 56 in the data distribution 58, wherein i is the number of data elements 56 in each bin determined by dividing the data elements 56 equally into the number of bins 80, wherein the value of the end point of each bin 80 is equal to the ith data element 56 after the last data element 56 in the proceeding bin 80, wherein the start point of each bin 80 is equal to data element 56 after the last data element 56 of the previous bin 80, step 406, else (b) if the number of data elements 56 in the data distribution 58 is not equally divisible by the number of bins 80, then the number of data elements 56 in each bin 80 is determined by dividing the number of data elements 56 by the number of bins 80, and then adding one to the count of the data elements 56 in each of a number of bins 80 equal to the remainder after dividing, wherein the bins 80 that have one added to the count is determined according to the following formula:

for k from 1 to r $$bin_{add} = INT((n*k)/(r+1))$$

next k wherein $bin_{add}$ is the sequential bin number to add one to the count of data elements to include therein, n is the total number of bins 80 in the data distribution model, r is the remainder from dividing the number of data elements 56 in the data distribution by the number of bins 80 in the data distribution model, and INT is a function for rounding the result of the bracketed formula to produce an integer result.

The computer program may perform the step of computing the number of data elements 56 in each bin 80 for the data distribution model 102 by counting, for each bin 80, each data element 56 satisfying the following formula:

start point<element value<=end point wherein the bin start point is the start point of the respective bin 80, element value is the value of each data element 56 in each bin 80, and end point is the end point of the respective bin 80.

A storage medium (70 in FIG. 1) may be provided for storing each data distribution model 102 by storing, for each bin 80, the start point, the end point, the number of data elements 56, and the parameters of the polynomial formula that best approximates the data elements 56 for the respective bin 80. Once the data distribution model 102 is stored, the original data distribution 58 from which the model was built no longer needs to be referred to. The computer program 54 may perform simple and complex statistical operations using the data model 102, or aggregations of two or more data models 102. For example, the computer program may determine the range of values of an aggregated data model 100 by subtracting the end point of the last bin in the aggregated data model 100 from the start point of the first bin 180 in the aggregated data model 100, without having to refer to the original data elements 56 in the data distributions 58. The computer program 54 may further determine the median value of the aggregated data model 100 by determining a number j computed by dividing the number of bins in the aggregated data model by 2, and then reading the value of the end point of the jth bin as the median value if the number of bins 180 in the aggregated data model 100 is equally divisible by 2 or by reading the value of the mid point interpolated by the polynomial formula of the jth bin if the number of bins in the aggregated data model 100 is not equally divisible by 2.

Figure 5:
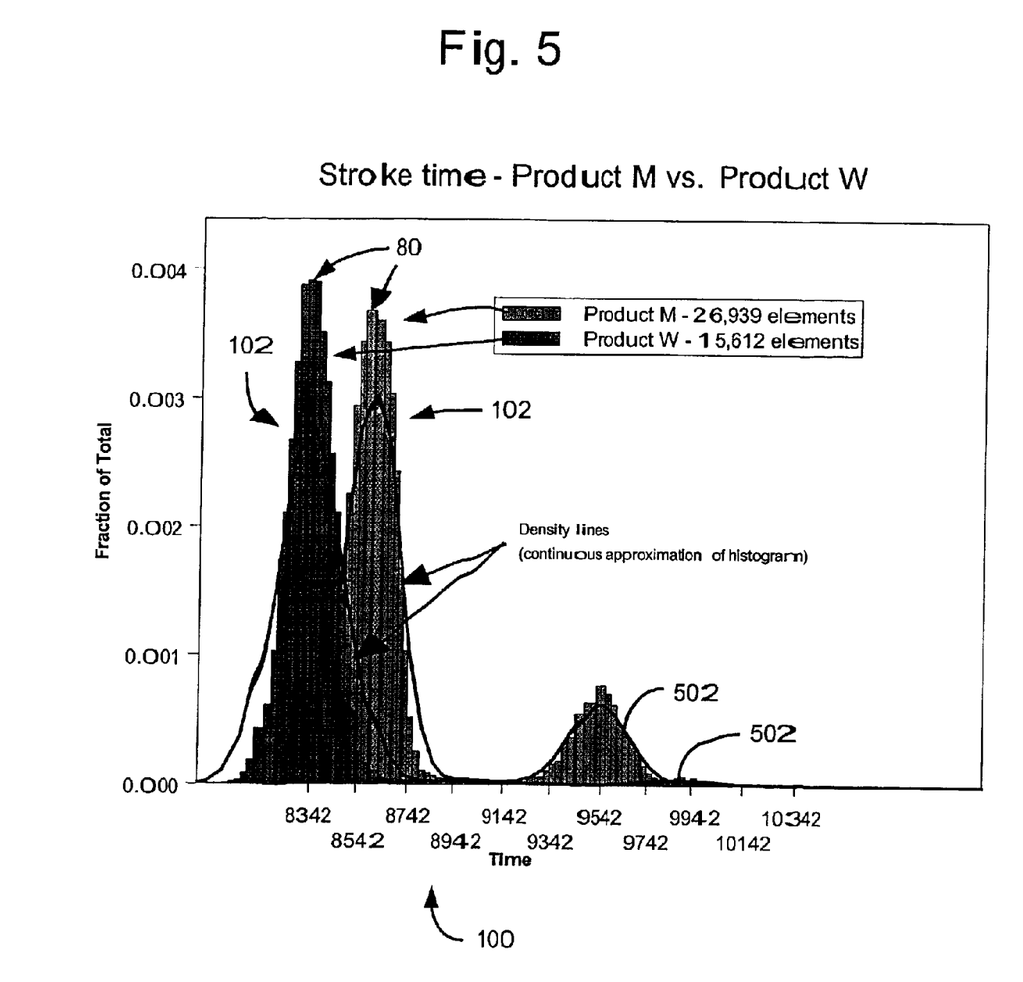
FIG. 5 is a graphic illustration of two data distributions represented as a histogram

With reference to FIG. 5, an example of two data distributions 58 represented in histograms representing the result of a measurement of stroke time, or time to sweep the heads across the media, in magnetic or optical disk drives is shown. One data distribution 58 is for product M, and one data distribution 58 is for product W. The bins 80 of the data distribution models 102, shown as bars, give a histogram of the disk drives with a specific time interval relative to the total population, shown as a faction thereof, and each solid line 502 is a continuous approximation of the data distribution 58 of the disk drives by time. In both cases integration of the total area enclosed is equal to 1. Note that product M has more data elements 56 than product W.

Figure 6:
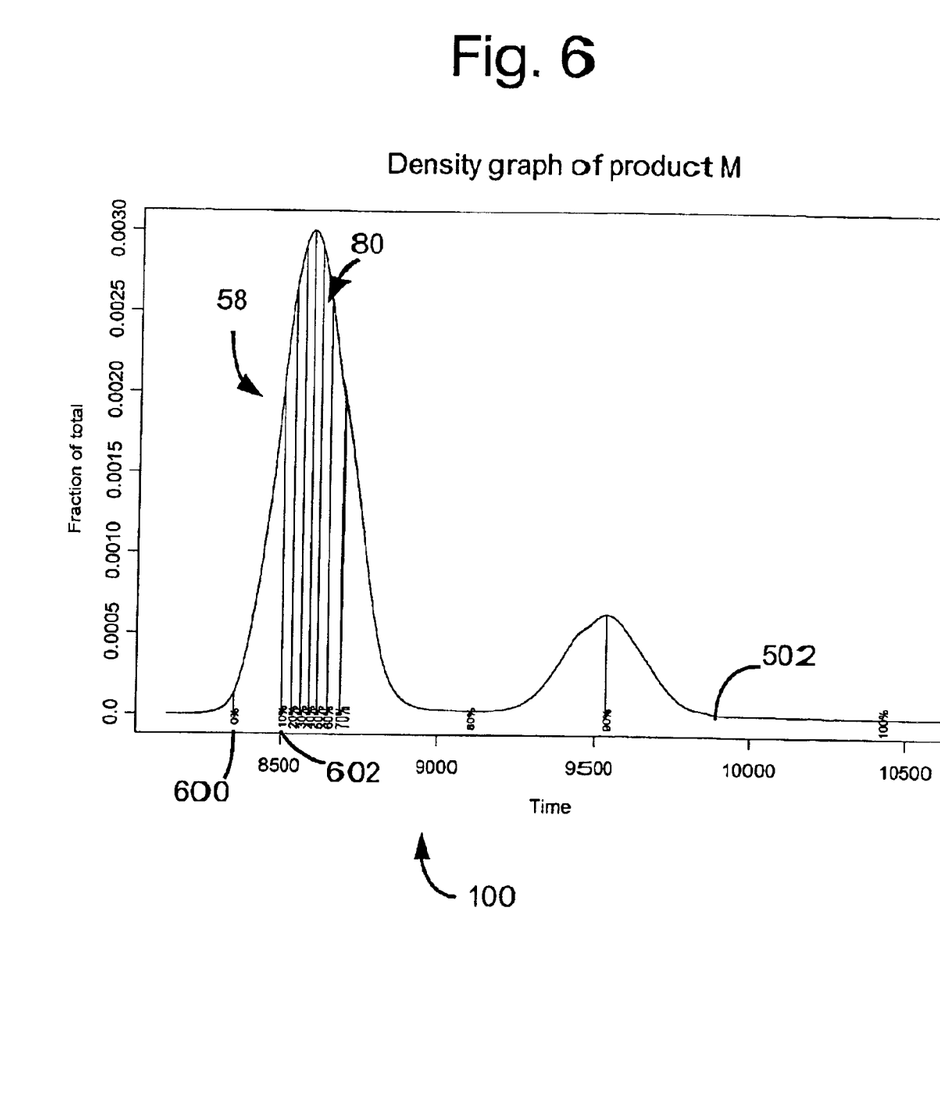
FIG. 6 is a graphic illustration of the data elements from one of the data distributions of FIG. 5 divided into bins.

With reference to FIG. 6, a graph of the data elements 56 divided into bins 80 from the data distribution 58 for product M from FIG. 5 is shown. The graph shows division of the curve into 10 bins (characterized by 11 end points). Information about the bins 80, including the number of data elements 56 in each bin 80 and parameters of the polynomial formula approximating the values of the data elements 56 within each bin 80 are stored in the storage medium 70 as shown in the table below.

| Bin # | Start of Bin (c) | End of Bin | # of elements | Parameter 1 (a) | Parameter 2 (b) |
|---|---|---|---|---|---|
| 1 | 8342 (min) |  | 2701 | 3.82E−6 | 5.4E−8 |
| 2 | 8503 |  | 2705 | 1.76E−5 | −6.1E−8 |
| 3 | 8540 |  | 2701 | 1.28E−5 | −1.07E−7 |
| 4 | 8569 |  | 2674 | 6.5E−6 | −1.26E−7 |
| 5 | 8596 |  | 2732 | −4.00E−7 | −1.23E−7 |
| 6 | 8624 |  | 2707 | −7.50E−6 | −9.88E−8 |
| 7 | 8655 |  | 2640 | −1.39E−5 | −4.95E−8 |
| 8 | 8693 |  | 2692 | −1.25E−5 | 2.19E−8 |
| 9 | 9107 |  | 2693 | −4.42E−7 | 4.69E−9 |
| 10 | 9542 | 10420 (max) | 2694 | −2.23E−6 | 1.87E−9 |

The table above shows the start points of the bins 80, which are the end points of preceding bins 80, the last end point of the last bin 80, and the parameters associated with a polynomial (spline) formula found using a spline fit for each bin 80 of the data elements 56 approximated from a data distribution 102. For example, the eighth record in the table indicates that the quadratic formula found by the computer program 54 to have the best fit comprises:

$$y = 0.0000125(x)^2 + 0.00000002.19(x) + 8693$$

In order to derive each polynomial formula, the computer program 54 may use techniques to fit the best approximation of the data elements 56 in each bin 80 of the respective data distribution 58 such as the least squares method, spline fit, linear fit, or other methods known to those skilled in the art for approximating the curve formed by the data elements 56.

Figure 7:
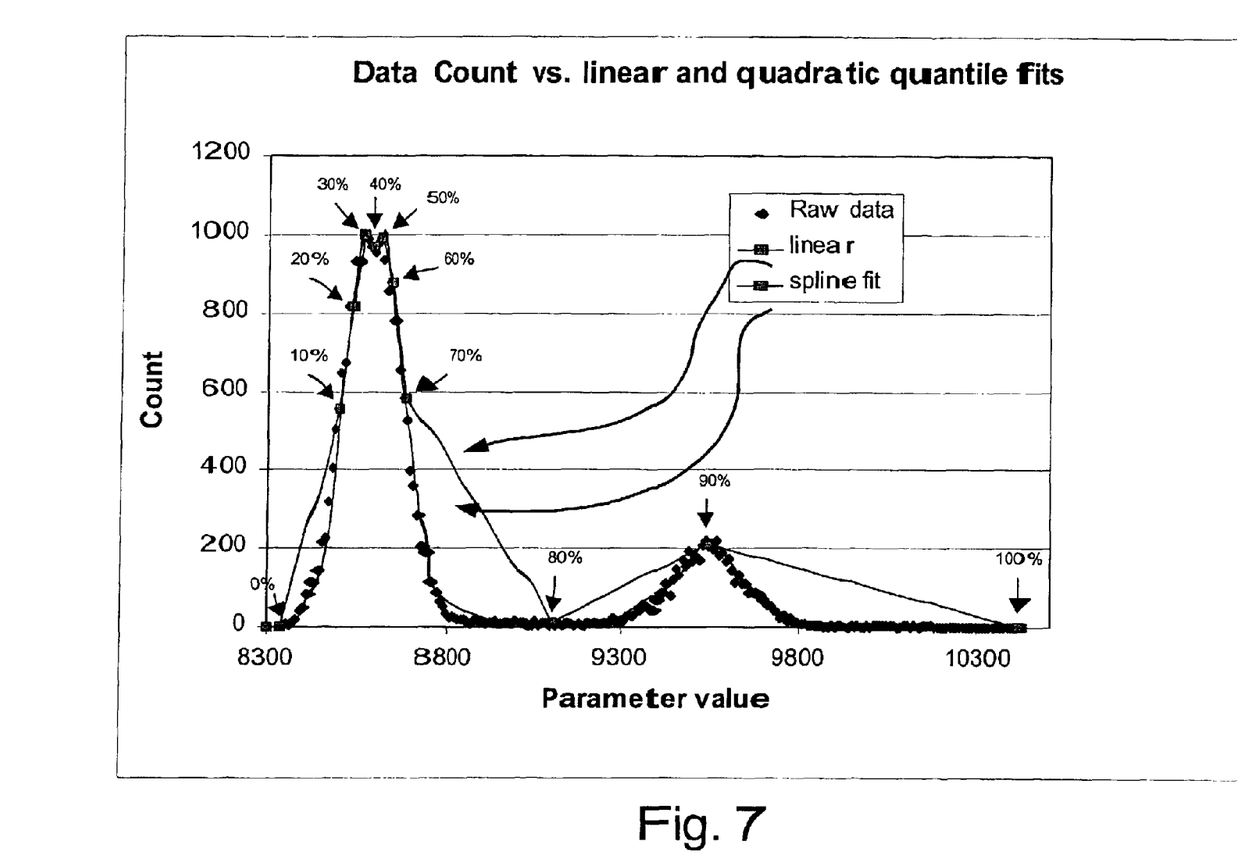
FIG. 7 is a graphic illustration of an approximation of the original data distribution from FIG. 6 using the quadratic and spline fit verses a linear fit.

The above table shows the minimum, maximum and median values of the data distribution 58 directly. FIG. 7 shows the approximation of the original data distribution 58 from FIG. 6 using the quadratic and spline fit verses a linear fit of the data distribution 58. As can be seen, a quadratic and spline fit is preferred because it offers a better approximation of the original raw data elements 56 that are also shown in FIG. 7. Typically it is expected that 100 bins 80 should be used for better fits. When 100 bins are used, linear interpolation between the end points of a bin 80 can be used— requiring less storage space in storage means 70 due to the higher bin density.

Thus, the data elements 56 from the original data distribution 58 can be reduced to 4*n+1 points for cubic spline fits, 3*n+1 points for quadratic fits, where n is the number of bins, or 2*n+1 points for linear fits. Therefore the sample data can be reduced from, for example, 26,939 data elements to 31 for 10 bins using a quadratic fit to the data in each bin 80, or 201 elements using straight linear interpolation (linear fit) between the end points of the bins 80.

The minimum value, maximum value and range may be directly read from the distribution summary as the starting element 56 of the first bin 80, the ending element 56 of the last bin 80 and the difference between maximum and minimum.

The median is simply the value of the middle of the data distribution 58. It can be directly read by determining the value associated with the middle bin 80. For example the value of the end point of the $5^{th}$ bin for 10 bins, or the $50^{th}$ bin for 100 bins, or, for example, the interpolated middle of the $51^{st}$ bin for 101 bins using the polynomial representation for the $51^{st}$ bin.

The inter quartile range is important in various statistical analysis. It can be found by subtracting the value of the $25^{th}$ percentile of the data which is the value of the end of the $25^{th}$ bin for n=100 bins, from the value of the $75^{th}$ percentiles, which is the value of the end of the $75^{th}$ bin for n=100 bins.

Because the mean and standard deviation are technically only applicable for a Gaussian, or normal, distributions, computation of these parameters may not be appropriate. If necessary though the standard method for computation is to assume the distribution is normal. In that case the median is equal to the mean and the standard deviation can be computed as the inter quartile range divided by 1.349.

For determining outliers of the data distribution 58 the inter quartile range (IQR) is used. Any data elements 56 greater than the value of the $75^{th}$ percentile (i.e., the end point of bin 75) plus 1.5* IQR can typically be considered an outlier.

Figure 8:
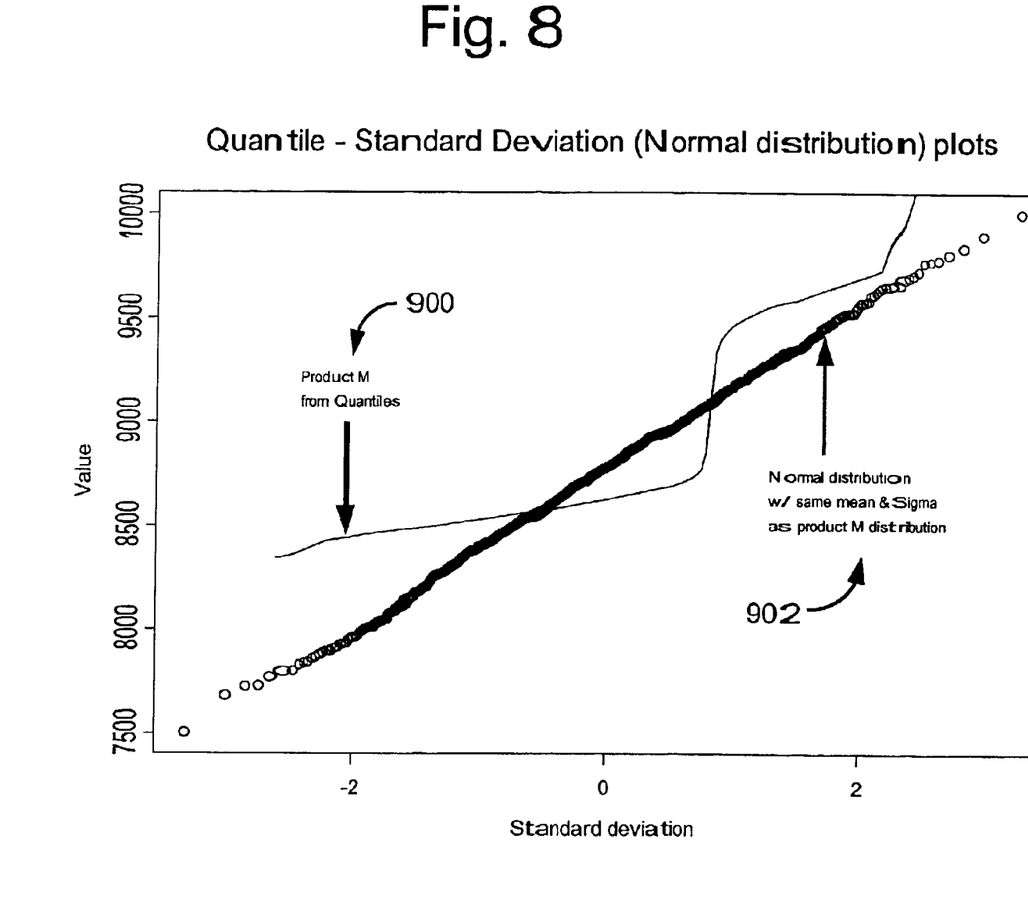
FIG. 8 is a graphic illustration showing the approximation error if a data distribution of FIG. 1 is treated as a normal distribution verses if the distribution is treated as a non-normal distribution using the system of FIG. 1.

With reference to FIG. 8, a graphic illustration showing the approximation error if a data distribution 58 is treated as a normal distribution verses if the data distribution 58 is treated as a non-normal distribution using the system of FIG. 1 is shown. Location 900 indicates a plot of the standard deviation found with respect to the value of the data element 56 when plotting quantiles. In contrast, location 903 shows same plot if a normal distribution is assumed. Other distributions can be evaluated for error as well, for example, Weibull, lognormal, Poisson, F, Chi-square, etc.

With reference to FIG. 9, a data model 100 illustrating an aggregated data model 100 aggregated from the data distribution models 102 of the data distributions 58 of FIG. 5 is shown. Linear interpolation and 100 bins are used to combine the data distribution models 102 from product M and Product W as shown in FIG. 1. Two tables were constructed to summarize the distributions into 100 bins as shown in Appendix 1. The above described methods are then applied to determine the start point, end point, and number of points for each bin 180.

APPENDIX 1

Summary tables for Product W, Product M and combined aggregation

| | Product W | | | Product M | | | Combined | | |
|---|---|---|---|---|---|---|---|---|---|
| Quantile | Bin Start | Bin End | Number | Bin Start | Bin End | Number | Bin Start | Bin End | Number |
| 1% | 7990 | 8121 | 158 | 8342 | 8427 | 271 | 7990 | 8155 | 426 |
| 2% | 8121 | 8143 | 156 | 8427 | 8446 | 261 | 8155 | 8185 | 426 |
| 3% | 8143 | 8160 | 156 | 8446 | 8459 | 275 | 8185 | 8204 | 425 |
| 4% | 8160 | 8171 | 156 | 8459 | 8468 | 265 | 8204 | 8219 | 426 |
| 5% | 8171 | 8181 | 156 | 8468 | 8475 | 241 | 8219 | 8232 | 425 |
| 6% | 8181 | 8190 | 156 | 8475 | 8482 | 286 | 8232 | 8243 | 426 |
| 7% | 8190 | 8197 | 156 | 8482 | 8488 | 285 | 8243 | 8254 | 425 |
| 8% | 8197 | 8203 | 156 | 8488 | 8493 | 261 | 8254 | 8264 | 426 |
| 9% | 8203 | 8209 | 156 | 8493 | 8498 | 269 | 8264 | 8272 | 425 |
| 10% | 8209 | 8214 | 157 | 8498 | 8502 | 230 | 8272 | 8281 | 426 |
| 11% | 8214 | 8219 | 156 | 8502 | 8507 | 304 | 8281 | 8289 | 425 |
| 12% | 8219 | 8224 | 156 | 8507 | 8511 | 274 | 8289 | 8296 | 426 |
| 13% | 8224 | 8229 | 156 | 8511 | 8515 | 261 | 8296 | 8303 | 425 |
| 14% | 8229 | 8234 | 156 | 8515 | 8519 | 261 | 8303 | 8310 | 426 |
| 15% | 8234 | 8238 | 156 | 8519 | 8523 | 282 | 8310 | 8317 | 425 |
| 16% | 8238 | 8241 | 156 | 8523 | 8526 | 234 | 8317 | 8324 | 426 |
| 17% | 8241 | 8246 | 156 | 8526 | 8529 | 247 | 8324 | 8331 | 425 |
| 18% | 8246 | 8250 | 156 | 8529 | 8533 | 336 | 8331 | 8338 | 426 |
| 19% | 8250 | 8254 | 157 | 8533 | 8536 | 230 | 8338 | 8345 | 425 |
| 20% | 8254 | 8258 | 156 | 8536 | 8539 | 264 | 8345 | 8351 | 426 |
| 21% | 8258 | 8261 | 156 | 8539 | 8542 | 246 | 8351 | 8358 | 425 |
| 22% | 8261 | 8264 | 156 | 8542 | 8545 | 266 | 8358 | 8365 | 426 |
| 23% | 8264 | 8267 | 156 | 8545 | 8548 | 267 | 8365 | 8371 | 425 |
| 24% | 8267 | 8271 | 156 | 8548 | 8551 | 272 | 8371 | 8379 | 426 |
| 25% | 8271 | 8274 | 156 | 8551 | 8554 | 273 | 8379 | 8386 | 425 |
| 26% | 8274 | 8277 | 156 | 8554 | 8557 | 280 | 8386 | 8394 | 426 |
| 27% | 8277 | 8280 | 156 | 8557 | 8560 | 321 | 8394 | 8402 | 425 |
| 28% | 8280 | 8283 | 157 | 8560 | 8563 | 258 | 8402 | 8410 | 426 |
| 29% | 8283 | 8286 | 156 | 8563 | 8566 | 281 | 8410 | 8419 | 425 |

APPENDIX 1-continued

Summary tables for Product W, Product M and combined aggregation

| | Product W | | | Product M | | | Combined | | |
|---|---|---|---|---|---|---|---|---|---|
| Quantile | Bin Start | Bin End | Number | Bin Start | Bin End | Number | Bin Start | Bin End | Number |
| 30% | 8286 | 8289 | 156 | 8566 | 8568 | 199 | 8419 | 8429 | 426 |
| 31% | 8289 | 8292 | 156 | 8568 | 8571 | 297 | 8429 | 8437 | 425 |
| 32% | 8292 | 8294 | 156 | 8571 | 8574 | 313 | 8437 | 8446 | 426 |
| 33% | 8294 | 8297 | 156 | 8574 | 8576 | 201 | 8446 | 8453 | 425 |
| 34% | 8297 | 8299 | 156 | 8576 | 8579 | 295 | 8453 | 8461 | 426 |
| 35% | 8299 | 8302 | 156 | 8579 | 8582 | 280 | 8461 | 8468 | 425 |
| 36% | 8302 | 8305 | 156 | 8582 | 8585 | 309 | 8468 | 8475 | 426 |
| 37% | 8305 | 8307 | 157 | 8585 | 8587 | 193 | 8475 | 8482 | 425 |
| 38% | 8307 | 8310 | 156 | 8587 | 8590 | 274 | 8482 | 8488 | 426 |
| 39% | 8310 | 8313 | 156 | 8590 | 8593 | 316 | 8488 | 8494 | 425 |
| 40% | 8313 | 8315 | 156 | 8593 | 8595 | 195 | 8494 | 8500 | 426 |
| 41% | 8315 | 8317 | 156 | 8595 | 8598 | 298 | 8500 | 8506 | 425 |
| 42% | 8317 | 8320 | 156 | 8598 | 8601 | 287 | 8506 | 8511 | 426 |
| 43% | 8320 | 8323 | 156 | 8601 | 8604 | 265 | 8511 | 8517 | 425 |
| 44% | 8323 | 8325 | 156 | 8604 | 8607 | 305 | 8517 | 8522 | 426 |
| 45% | 8325 | 8328 | 156 | 8607 | 8609 | 214 | 8522 | 8527 | 425 |
| 46% | 8328 | 8330 | 157 | 8609 | 8612 | 260 | 8527 | 8532 | 426 |
| 47% | 8330 | 8333 | 156 | 8612 | 8615 | 313 | 8532 | 8537 | 425 |
| 48% | 8333 | 8335 | 156 | 8615 | 8618 | 283 | 8537 | 8541 | 426 |
| 49% | 8335 | 8338 | 156 | 8618 | 8620 | 204 | 8541 | 8546 | 425 |
| 50% | 8338 | 8340 | 156 | 8620 | 8623 | 297 | 8546 | 8551 | 426 |
| 51% | 8340 | 8343 | 156 | 8623 | 8626 | 305 | 8551 | 8555 | 425 |
| 52% | 8343 | 8345 | 156 | 8626 | 8629 | 254 | 8555 | 8559 | 426 |
| 53% | 8345 | 8348 | 156 | 8629 | 8632 | 289 | 8559 | 8563 | 425 |
| 54% | 8348 | 8351 | 156 | 8632 | 8635 | 265 | 8563 | 8568 | 426 |
| 55% | 8351 | 8353 | 157 | 8635 | 8638 | 260 | 8568 | 8572 | 425 |
| 56% | 8353 | 8356 | 156 | 8638 | 8641 | 241 | 8572 | 8576 | 426 |
| 57% | 8356 | 8358 | 156 | 8641 | 8645 | 342 | 8576 | 8580 | 425 |
| 58% | 8358 | 8361 | 156 | 8645 | 8648 | 240 | 8580 | 8585 | 426 |
| 59% | 8361 | 8363 | 156 | 8648 | 8650 | 300 | 8585 | 8589 | 425 |
| 60% | 8363 | 8366 | 156 | 8650 | 8654 | 253 | 8589 | 8593 | 426 |
| 61% | 8366 | 8368 | 156 | 8654 | 8657 | 222 | 8593 | 8598 | 425 |
| 62% | 8368 | 8371 | 156 | 8657 | 8661 | 328 | 8598 | 8602 | 426 |
| 63% | 8371 | 8374 | 156 | 8661 | 8664 | 221 | 8602 | 8606 | 425 |
| 64% | 8374 | 8377 | 157 | 8664 | 8668 | 319 | 8606 | 8611 | 426 |
| 65% | 8377 | 8380 | 156 | 8668 | 8671 | 232 | 8611 | 8615 | 425 |
| 66% | 8380 | 8383 | 156 | 8671 | 8675 | 296 | 8615 | 8619 | 426 |
| 67% | 8383 | 8386 | 156 | 8675 | 8679 | 252 | 8619 | 8623 | 425 |
| 68% | 8386 | 8389 | 156 | 8679 | 8683 | 261 | 8623 | 8628 | 426 |
| 69% | 8389 | 8391 | 156 | 8683 | 8687 | 272 | 8628 | 8632 | 425 |
| 70% | 8391 | 8395 | 156 | 8687 | 8692 | 248 | 8632 | 8637 | 426 |
| 71% | 8395 | 8398 | 156 | 8692 | 8697 | 294 | 8637 | 8642 | 425 |
| 72% | 8398 | 8401 | 156 | 8697 | 8703 | 293 | 8642 | 8647 | 426 |
| 73% | 8401 | 8404 | 157 | 8703 | 8709 | 247 | 8647 | 8651 | 425 |
| 74% | 8404 | 8408 | 156 | 8709 | 8717 | 292 | 8651 | 8657 | 426 |
| 75% | 8408 | 8411 | 156 | 8717 | 8724 | 254 | 8657 | 8662 | 425 |
| 76% | 8411 | 8414 | 156 | 8724 | 8734 | 278 | 8662 | 8668 | 426 |
| 77% | 8414 | 8418 | 156 | 8734 | 8748 | 281 | 8668 | 8673 | 425 |
| 78% | 8418 | 8421 | 156 | 8748 | 8771 | 271 | 8673 | 8680 | 426 |
| 79% | 8421 | 8425 | 156 | 8771 | 8848 | 274 | 8680 | 8686 | 425 |
| 80% | 8425 | 8429 | 156 | 8848 | 9106 | 268 | 8686 | 8694 | 426 |
| 81% | 8429 | 8433 | 156 | 9106 | 9338 | 270 | 8694 | 8702 | 425 |
| 82% | 8433 | 8437 | 157 | 9338 | 9397 | 270 | 8702 | 8712 | 426 |
| 83% | 8437 | 8441 | 156 | 9397 | 9426 | 269 | 8712 | 8724 | 425 |
| 84% | 8441 | 8446 | 156 | 9426 | 9449 | 269 | 8724 | 8740 | 426 |
| 85% | 8446 | 8450 | 156 | 9449 | 9467 | 270 | 8740 | 8770 | 425 |
| 86% | 8450 | 8455 | 156 | 9467 | 9484 | 269 | 8770 | 8931 | 426 |
| 87% | 8455 | 8460 | 156 | 9484 | 9499 | 270 | 8931 | 9235 | 425 |
| 88% | 8460 | 8465 | 156 | 9499 | 9514 | 269 | 9235 | 9397 | 426 |
| 89% | 8465 | 8471 | 156 | 9514 | 9528 | 269 | 9397 | 9439 | 425 |
| 90% | 8471 | 8478 | 156 | 9528 | 9541 | 270 | 9439 | 9468 | 426 |
| 91% | 8478 | 8484 | 157 | 9541 | 9554 | 269 | 9468 | 9493 | 425 |
| 92% | 8484 | 8492 | 156 | 9554 | 9567 | 269 | 9493 | 9517 | 426 |
| 93% | 8492 | 8503 | 156 | 9567 | 9580 | 270 | 9517 | 9538 | 425 |
| 94% | 8503 | 8515 | 156 | 9580 | 9595 | 269 | 9538 | 9558 | 426 |
| 95% | 8515 | 8530 | 156 | 9595 | 9611 | 270 | 9558 | 9579 | 425 |
| 96% | 8530 | 8562 | 156 | 9611 | 9632 | 269 | 9579 | 9602 | 426 |
| 97% | 8562 | 8689 | 156 | 9632 | 9654 | 269 | 9602 | 9632 | 425 |
| 98% | 8689 | 9158 | 156 | 9654 | 9684 | 270 | 9632 | 9670 | 426 |
| 99% | 9158 | 9819 | 156 | 9684 | 9728 | 269 | 9670 | 9761 | 425 |
| 100% | 9819 | 11018 | 156 | 9728 | 10420 | 269 | 9761 | 11018 | 426 |

What is claimed is:

1. A system for creating an aggregated data model from a plurality of data distribution models, each data distribution model describing a data distribution having one or more data elements, each data element having a value, each data distribution model having one or more bins, each bin comprising a start point having a value, an end point having a value, a value indicating the number of data elements for each bin, and a polynomial formula associated with each bin, the polynomial formula approximating the data elements for the respective bin, said system comprising:

a processor; and a computer program executable on said processor, the computer program adapted to perform the following steps:

(a) determining which start point has the minimum value and which end point has the maximum value of all of the bins of all of the data distribution models;

(b) setting a start point of a first bin of the aggregated data model to said start point determined to have the minimum value;

(c) setting an end point of a last bin of the aggregated data model to said end point determined to have the maximum value;

(d) determining a total number of a plurality of points for the aggregated data model by adding the values indicating the number of data elements from all bins from all data distribution models;

(e) approximating the data elements in the data distribution described by each data distribution model using the start point, polynomial formula, and number of data elements for each bin in each respective data distribution model, each approximated data element comprising one of said points in the aggregated data model;

(f) sorting the points from minimum to maximum;

(g) distributing the points into one or more bins in the aggregated data model such that a substantially equal number of points are in each bin of the aggregated data model; and (h) determining a polynomial formula with the sorted data elements for each bin of the aggregated data model.

2. The system of claim 1, wherein the computer program is further for determining the end point for each bin in the aggregated data model.

3. The system of claim 1, wherein the computer program is adapted to perform the step of distributing the points into the one or more bins of the aggregated data model according to the following formula:

(g)(1) if the number of points in the aggregated data model is equally divisible into the number of bins, the end point of the first bin is equal to the value of the ith point in the aggregated data model, wherein i is the number of points in each bin determined by dividing the points equally into the number of bins, wherein the value of the end point of each bin is equal to the value of the ith point after the last point in the proceeding bin, wherein the start point of each bin is equal to the point after the last point of the previous bin, else (g)(2) if the number of data elements in the points is not equally divisible by the number of bins, then the number of points in each bin is determined by dividing the number of points by the number of bins, and then adding one to the count of the points in each of a number of bins equal to the remainder after dividing, wherein the bins that have one added to the count is determined according to the following formula:

for k from 1 to r $\text{bin}_{add} = \text{INT}((n*k)/(r+1))$ next k wherein $\text{bin}_{add}$ is the sequential bin number to add one to the count of points to include therein, n is the total number of bins in the aggregated data model, r is the remainder from dividing the number of points in the data distribution by the number of bins, and INT is a function for rounding the result of the bracketed formula to produce an integer result.

4. The system of claim 1, wherein the computer program is for performing separately for each bin of the aggregated data model, the steps of approximating the data elements for each bin, determining the end point for each bin, and determining the polynomial formula for each bin.

5. The system of claim 1, wherein each data distribution model is the result of the computer program performing the following steps:

(A) sorting the data elements in each data distribution from minimum to maximum;

(B) computing the number of data elements in each data distribution;

(C) determining the value of the start point and the value of the end point of each bin by dividing the data elements into a plurality of substantially equal sized bins for each data distribution;

(D) counting the number of data elements in each bin for each data distribution; and (E) computing each distribution model for each data distribution, each distribution model comprising, for each bin, the start point of the bin, the end point of the bin, and the number of data elements in the bin.

6. The system of claim 5, wherein the computer program is adapted to perform the following steps for determining the start points and end points of the bins for each data distribution model:

(C)(1) selecting as the start point of the first bin the value of the data element having the minimum value in the sorted data distribution;

(C)(2) if the number of data elements in the data distribution is equally divisible into the number of bins, the end point of the first bin is equal to the value of the ith data element in the data distribution, wherein i is the number of data elements in each bin determined by dividing the data elements equally into the number of bins, wherein the value of the end point of each bin following the first bin is equal to the value of the ith data element after the last data element in the proceeding bin, wherein the start point of each bin is equal to the data element after the last data element of the previous bin, and (C)(3) if the number of data elements in the data distribution is not equally divisible by the number of bins, then the number of data elements in each bin is determined by dividing the number of data elements by the number of bins, and then adding one to the count of the data elements in each of a number of bins equal to the remainder after dividing, wherein the bins that have one added to the count is determined according to the following formula:

for k from 1 to r $\text{bin}_{add} = \text{INT}((n*k)/(r+1))$ next k wherein bin$_{add}$ is the sequential bin number to add one to the count of data elements to include therein, n is the total number of bins in the data distribution model, r is the remainder from dividing the number of data elements in the data distribution by the number of bins, and INT is a function for rounding the result of the bracketed formula to produce an integer result.

7. The system of claim 6, wherein the computer program is further for performing the step of counting by counting, for each bin, each data element satisfying the following formula:

$$\text{start point} < \text{element value} <= \text{end point}$$

wherein the bin start point is the start point of the respective bin, element value is the value of each data element in each bin, and end point is the end point of the respective bin.

8. The system of claim 7, comprising a storage medium for storing each data distribution model by storing, for each bin, the start point, the end point, the number of data elements, and the parameters of the polynomial formula.

9. The system of claim 1, wherein the computer program is further for performing one or more statistical analysis using the aggregated data model.

10. The system of claim 9, wherein the statistical analysis performed comprises determining the range of the points of the aggregated data model analyzed by subtracting end point of the last bin in the aggregated data model from the start point of the first bin in the aggregated data model.

11. The system of claim 9, wherein the statistical analysis performed comprises determining the inter quantile range of the points of the aggregated data model.

12. The system of claim 9, wherein the statistical analysis performed comprises determining the median value of the aggregated data model by determining a number j computed by dividing the number of bins by 2, and then reading the value of the end point of the jth bin as the median value if the number of bins in the aggregated data model is equally divisible by 2 or by reading the interpolated value using the polynomial function of the mid point of the jth bin if the number of bins in the aggregated data model is not equally divisible by 2.

* * * * *